June 12, 1951 E. BACH ET AL 2,556,787
REGISTER CONTROL FOR WEB FED CASEMAKING MACHINES
Filed Feb. 12, 1949 10 Sheets-Sheet 5

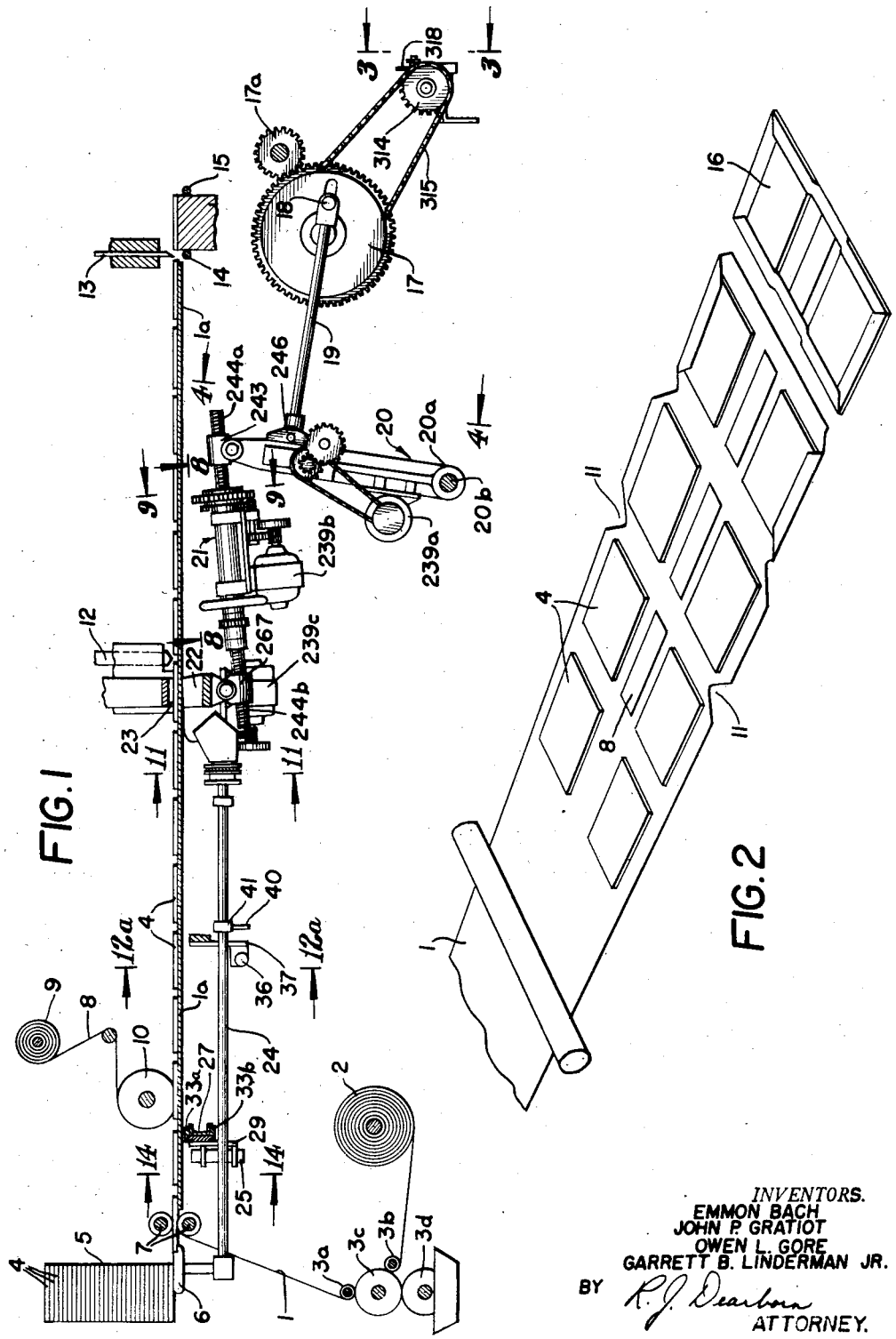

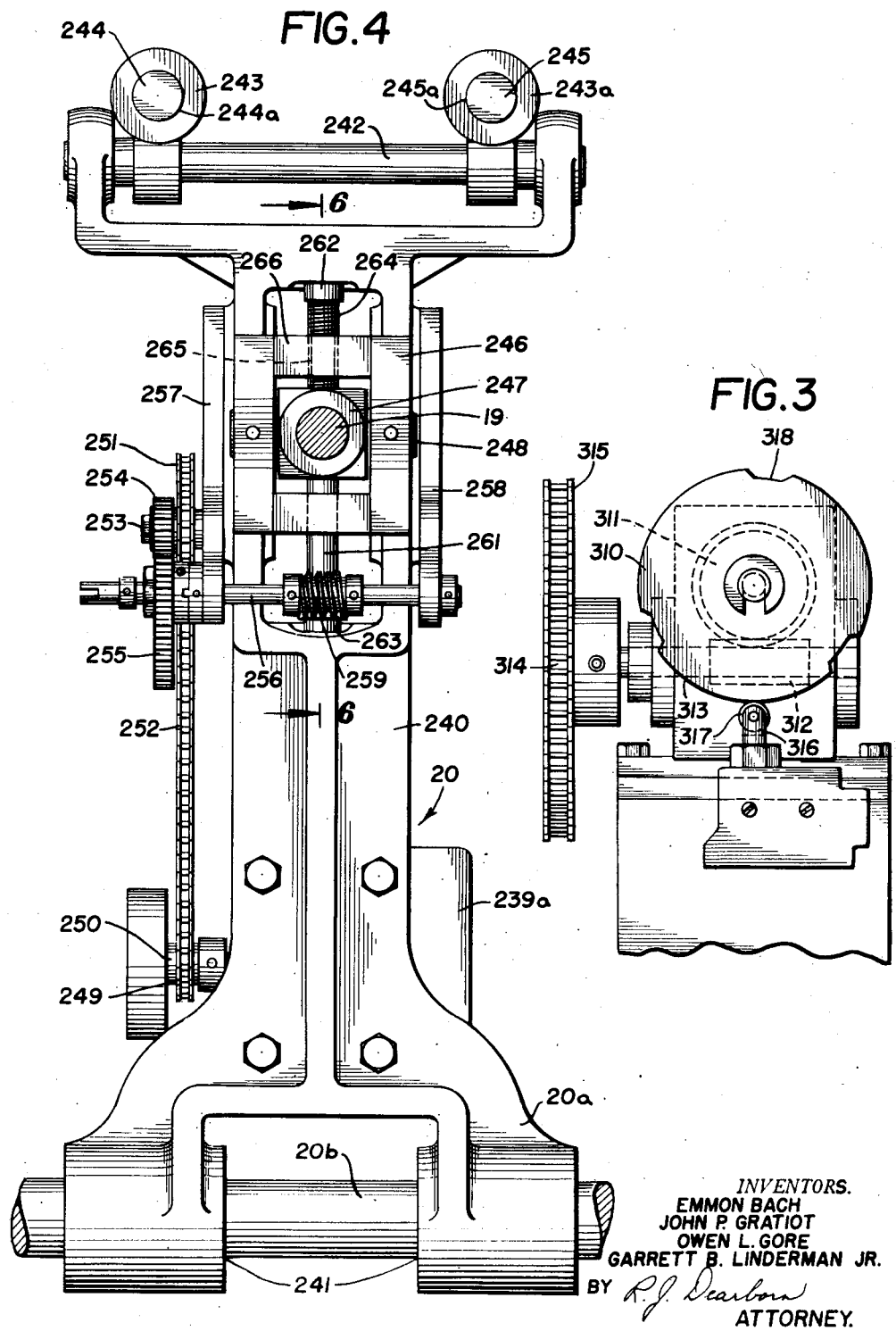

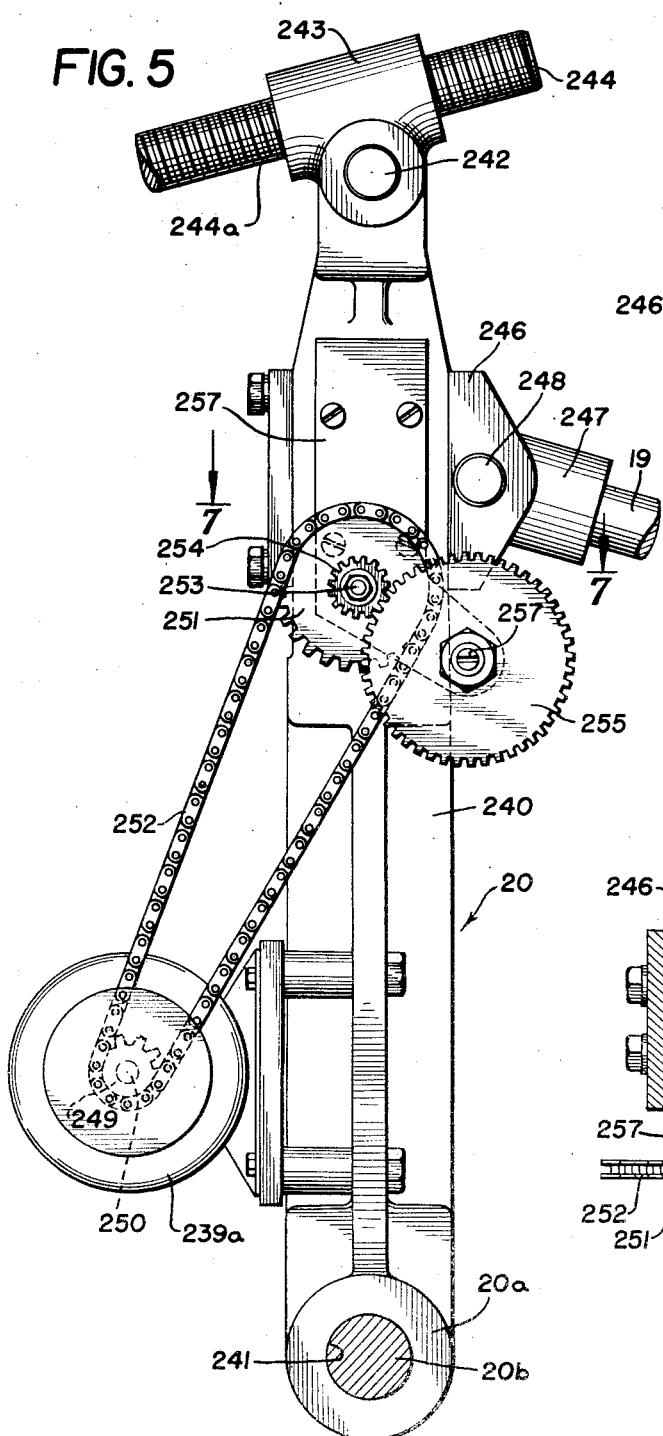
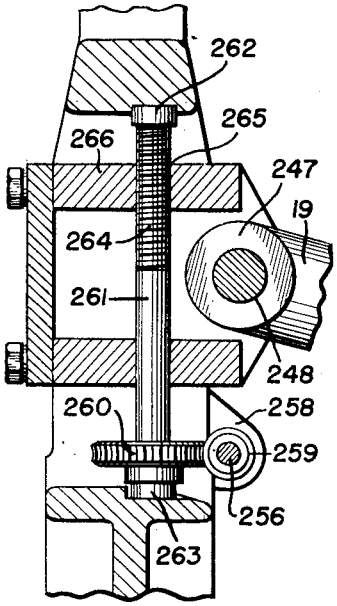
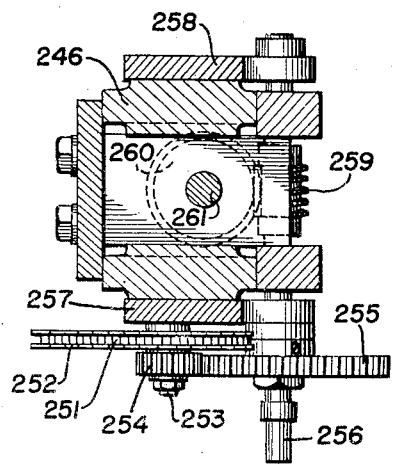

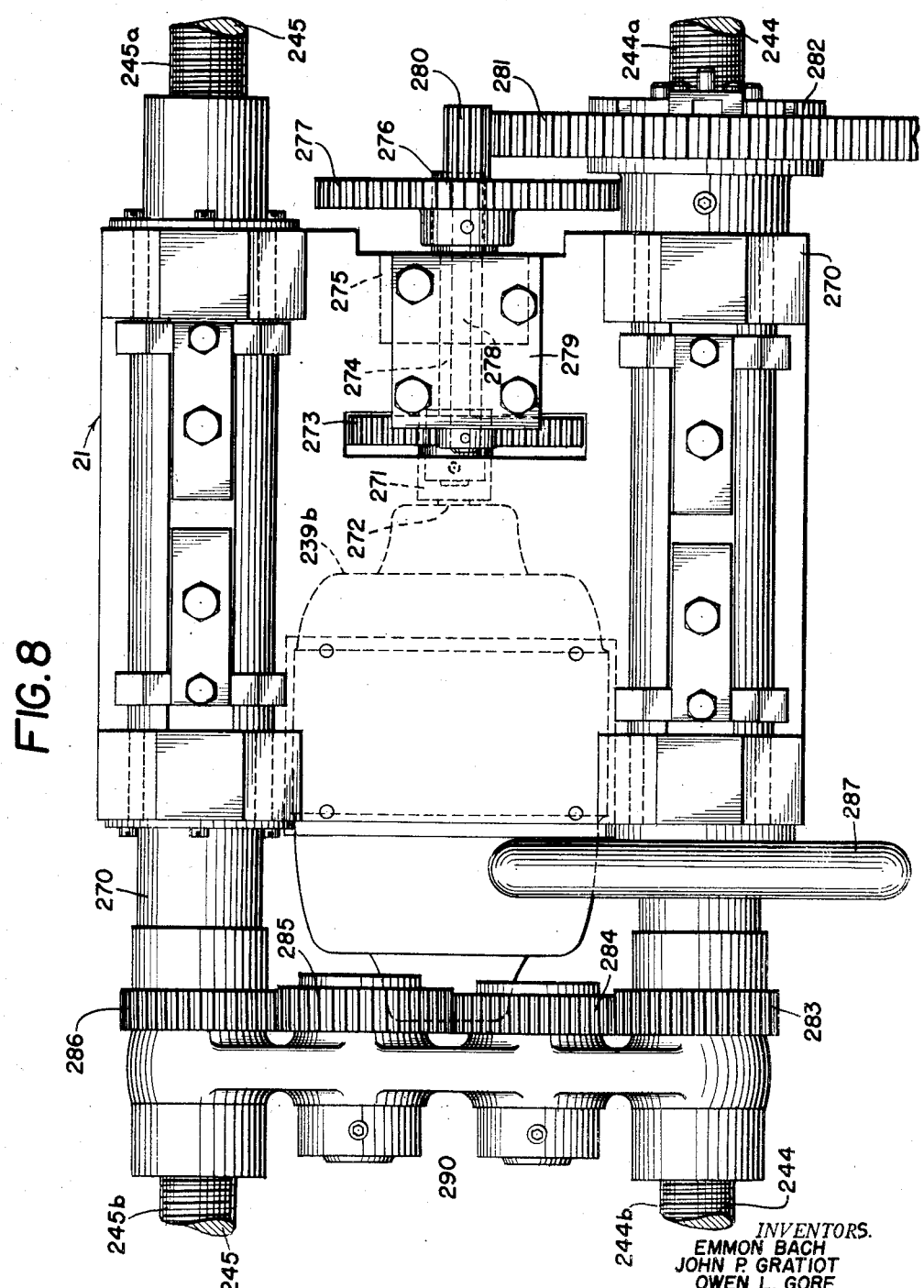

INVENTORS.
EMMON BACH
JOHN P. GRATIOT
OWEN L. GORE
GARRETT B. LINDERMAN JR.
BY R. J. Dearborn
ATTORNEY.

June 12, 1951  E. BACH ET AL  2,556,787
REGISTER CONTROL FOR WEB FED CASEMAKING MACHINES
Filed Feb. 12, 1949  10 Sheets-Sheet 6
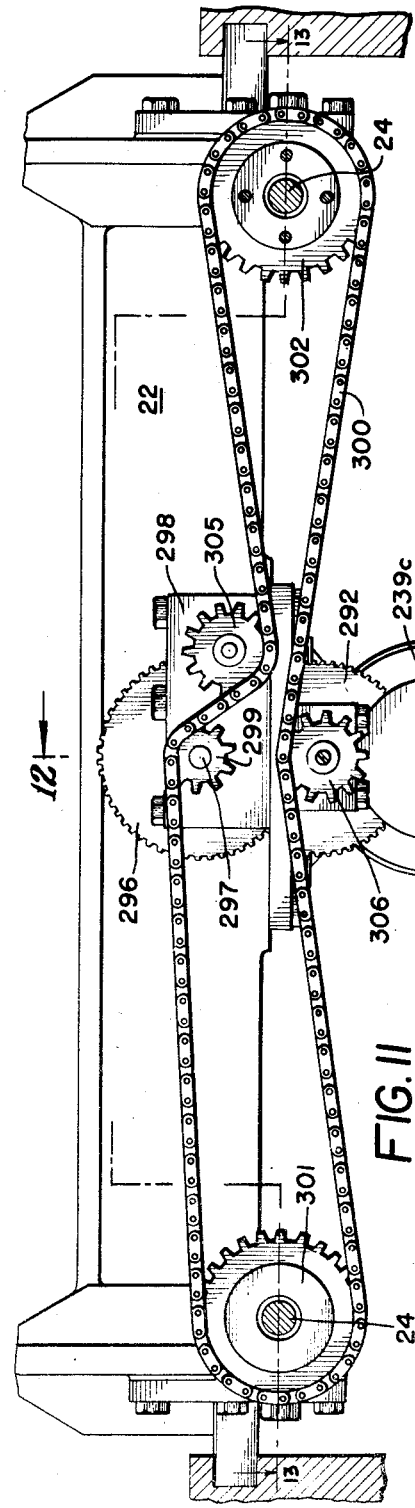
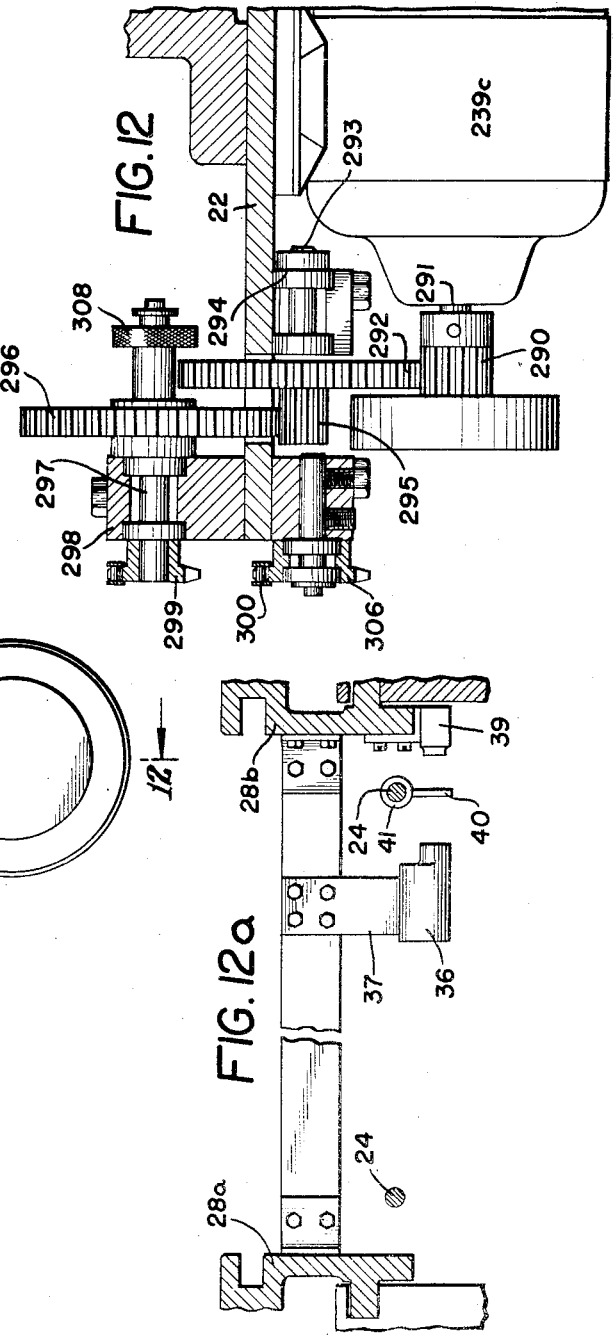
INVENTORS.
EMMON BACH
JOHN P. GRATIOT
OWEN L. GORE
GARRETT B. LINDERMAN JR.
BY R.J. Dearborn
ATTORNEY.

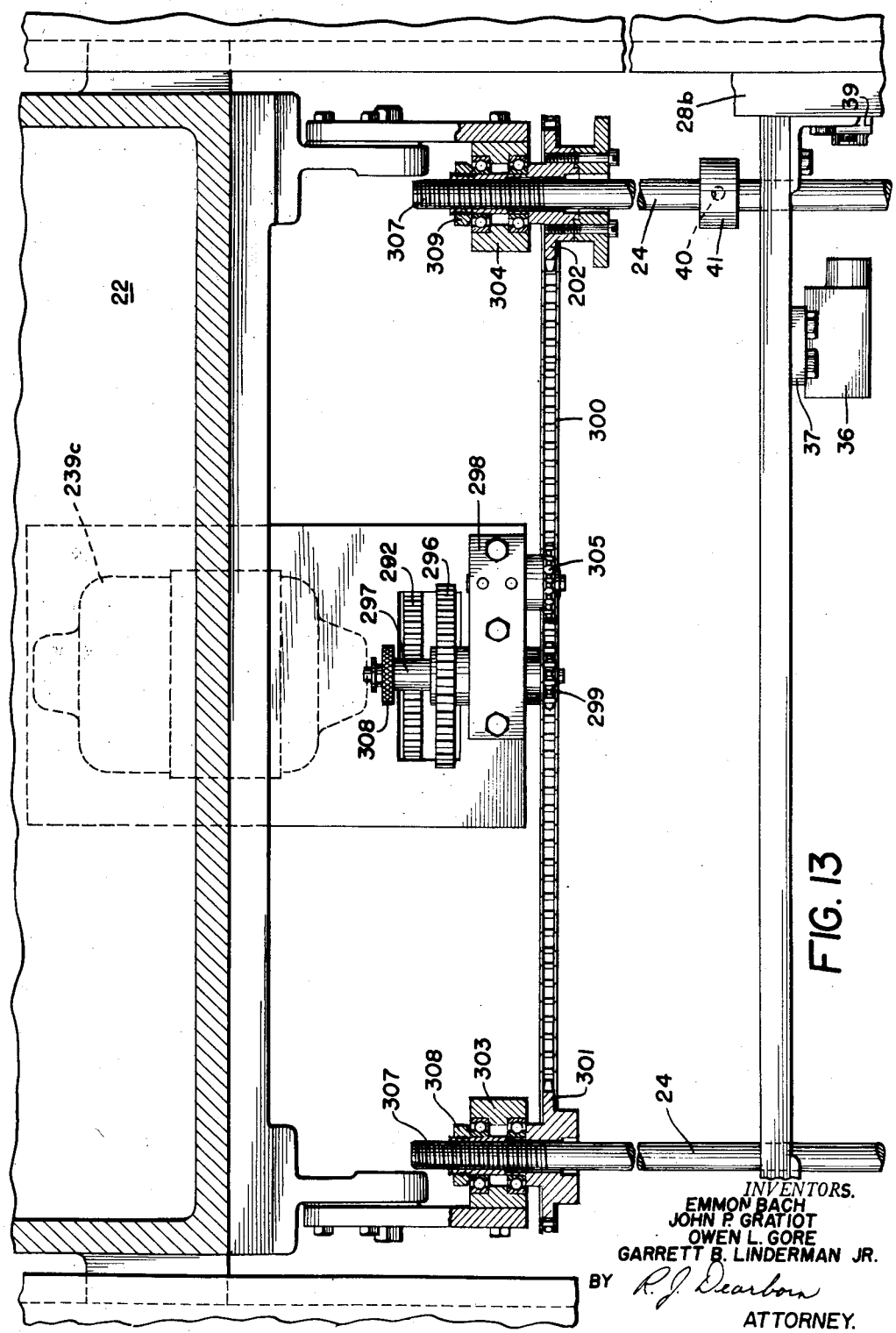

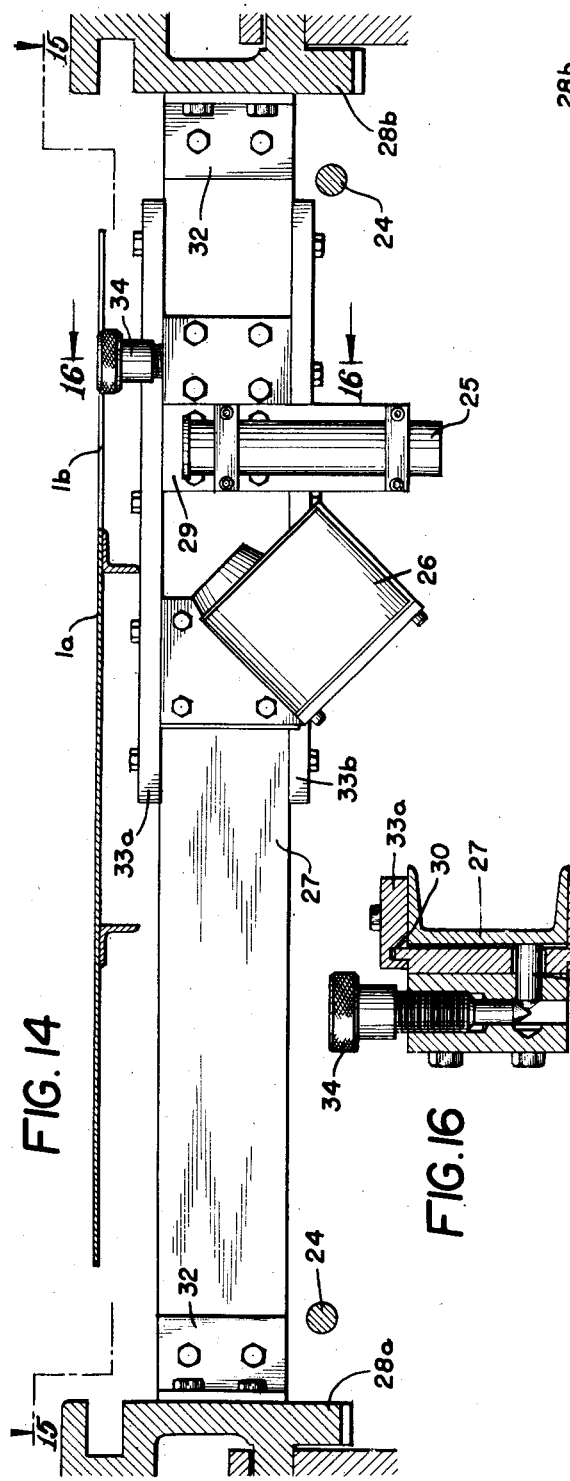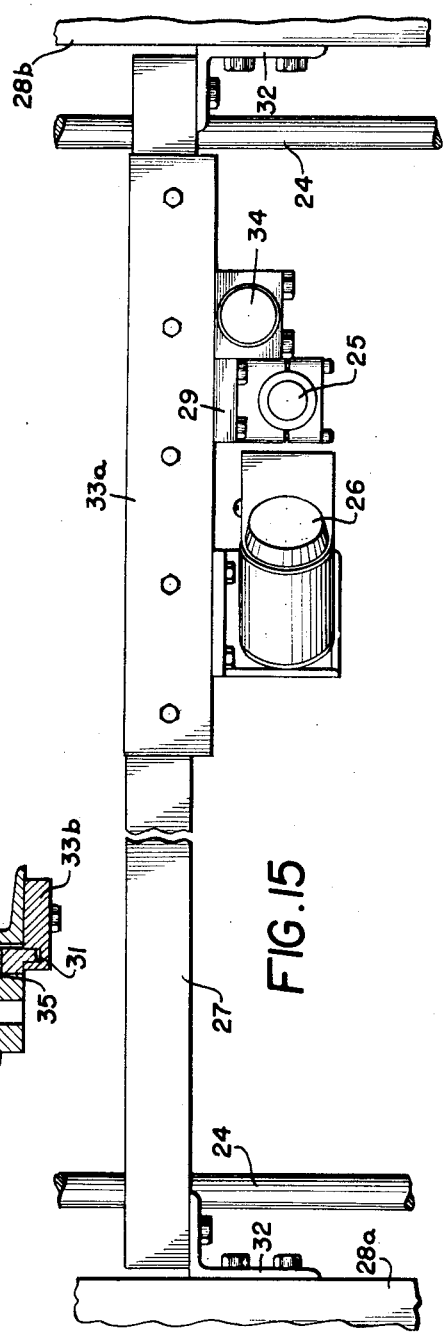

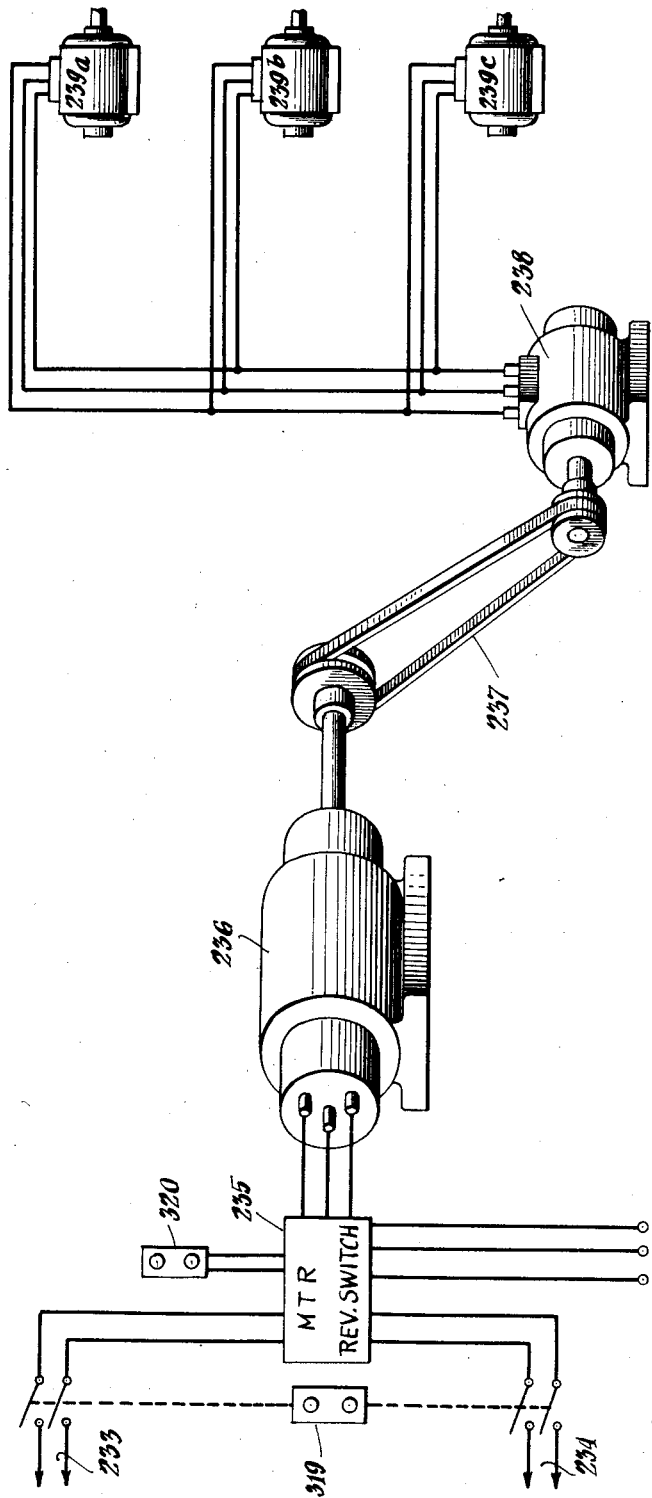

Patented June 12, 1951

2,556,787

UNITED STATES PATENT OFFICE 2,556,787

REGISTER CONTROL FOR WEB FED CASEMAKING MACHINES

Emmon Bach, Scarborough, John P. Gratiot, New York, and Owen L. Gore, Douglaston, N. Y., and Garrett B. Linderman, Jr., Washington, D. C., assignors, by mesne assignments, to The de Florez Company, Inc., a corporation of Delaware Application February 12, 1949, Serial No. 75,984

13 Claims. (Cl. 154—41)

This invention relates to control apparatus, and particularly to apparatus to control the register of preprinted or prestamped webs of case material in the manufacture of hard casing for books.

In the manufacture of hard casings for books, it is the customary practice to use unprinted or blank webs of case material to form the casing and then to print the desired characters upon the finished case in a separate operation. It is highly desirable, from the point of view of both convenience and economy, to utilize preprinted or prestamped webs of case material instead of the unprinted webs in universal use today. A principal object of this invention, therefore, is to provide a simple and efficient apparatus which will permit the utilization of preprinted or prestamped webs of case material in the manufacture of hard casings for books.

In the manufacture of hard casings for books, it is also the customary practice to have an operator in constant attendance to manually adjust the casemaker during operation. Another object of this invention is to provide a register control that will dispense with manual adjustments during operation.

The fundamental requirement of a register control for a casemaking machine is that it control the application of the cardboards, which are the usual stiffening elements used in making up the front and back covers of a hard cased book, to the web material in such a manner that printed matter appearing on the web will always bear a predetermined constant dimensional relationship to the cardboards. Another object of this invention is to provide a register control that will assure the desired positional deposition of the cardboard cover elements on a web of preprinted or prestamped case material.

A further object of this invention is to provide a register control of suitable sensitivity to prevent undue spoilage of cases in process on the machine.

A further object of this invention is to provide a register control which may be operated automatically or manually to control the application of cardboard cover elements on a web of preprinted or prestamped cover material.

Referring to the drawings:

Figure 1 is a side sectional view of a casemaking machine embodying the invention;

Fig. 2 is a schematic representation of a case in the making;

Fig. 3 is a vertical section on the line 3—3 of Fig. 1;

Fig. 4 is a vertical section of the multiplier link on the line 4—4 of Fig. 1;

Fig. 5 is a side view of the multiplier link;

Fig. 6 is a vertical section on the line 6—6 of Fig. 4;

Fig. 7 is a horizontal section on the line 7—7 of Fig. 5;

Fig. 8 is a top view of the turnbuckle link on the line 8—8 of Fig. 1;

Fig. 11 is an end view of the board puller adjusting means on the line 11—11 of Fig. 1;

Fig. 12 is a vertical section on the line 12—12 of Fig. 11;

Fig. 12a is a section on line 12a—12a of Fig. 1;

Fig. 13 is a horizontal section on the line 13—13 of Fig. 11;

Fig. 14 is a vertical section on the line 14—14 of Fig. 1;

Fig. 15 is a horizontal section on the line 15—15 of Fig. 14;

Fig. 16 is a vertical section on the line 16—16 of Fig. 14;

Fig. 18 is a schematic representation of the driving system for the corrective apparatus.

Figure 9:
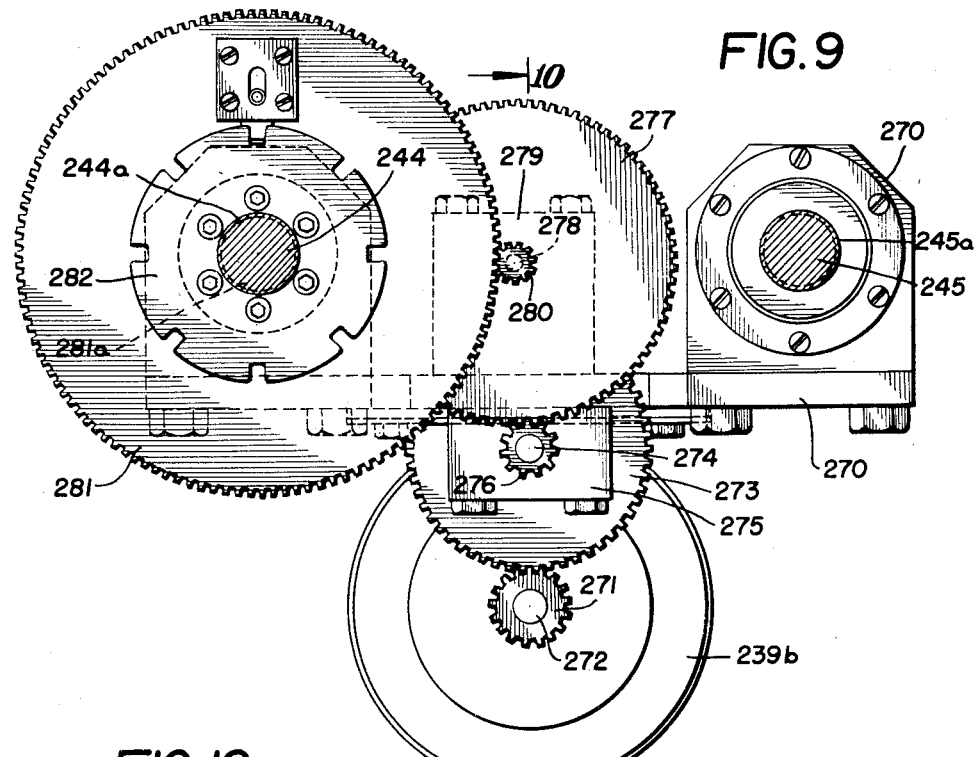
Fig. 9 is an end view of the turnbuckle link on the line 9—9 of Fig. 1.

A brief examination of the operational steps involved in the making of hard casings for books in a web fed casemaking machine will aid in a clear understanding of the invention.

Referring to Figs. 1 and 2, it may be explained that the making of hard casings for books by a continuous web fed process involves the following basic machine parts and the following or analogous operations. A web 1 of case material is drawn from a supply roll 2. Glue is applied to one side of the web 1 by a system of glue rollers 3a, 3b, 3c, 3d, intermediate the supply roll 2 and the main operating table 1a. Supplies of cardboards 4, the stiffening elements in the front and back covers of conventional hard casings, are stored in dual supply hoppers 5 from which individual cardboards are drawn by the board pulling members 6. A pair of pressure rollers 7 fix the newly drawn cardboards 4 securely to the glued surface of the web 1. Strips of backlining tape 8, fed from a supply roll 9, are applied to the web 1 between the cardboards 4 by a suction wheel 10, which severs the backlining tape into the proper lengths before applying the individual severed lengths to the web 1. Folding notches 11, to facilitate the folding of the edges of the case material over the cardboards 4, are cut on the opposite sides of the web 1 by a pair of vertically reciprocating knives 12. After the notching operation, the web is folded over the sides of the cardboards by rollers, not shown, and a large knife 13 severs the web laterally into individual case units. A pair of lateral folding rollers 14, 15 then make the lateral folds to complete a finished case 16 which is ejected from the machine.

The drive for the machine is supplied externally to a cycle shaft 17 through a gear 17a. The cycle shaft 17 carries thereon a slot mounted adjustable crank pin 18. Said crank pin 18 is slidably mounted within said slot and is capable of being fixed in position at any desired radial distance from the axis of rotation of said cycle shaft 17. Through a connecting rod 19, the crank pin 18 drives a multiplier link 20 in angular oscillation about its lower end 20a which encompasses a fixed shaft 20b. This multiplier link 20 in turn, through a structural turnbuckle link 21, transmits linear horizontal reciprocating motion to a slide table 22. The slide table 22 carries the vertically reciprocating notching knives 12 and a large clamp 23 which furnishes the only positive drive for the web of casemaking material 1. The clamp 23 is cam actuated to grip the web and advance it on the draw stroke. At the conclusion of the draw stroke portion of the cycle, the clamp releases the web and moves back to the point where the draw stroke begins, the web not moving during the return portion of the cycle. Also secured to the slide table 22 are pull rods 24, on which the board pulling members 6 are adjustably mounted. Thus as the slide table 22 reciprocates horizontally, the board pulling members 6 do likewise.

A conventional web fed casemaking machine is designed to operate with a fixed length of case material between each pair of cardboards. This length represents the amount of material needed to make the necessary folds at the top and bottom of the case as shown in Fig. 2. This length, however, may not be varied beyond predetermined tolerances in order to avoid spoilage and the formation of unsatisfactory cases. The knife 13, which laterally severs the web in the center of this length, is fixed in position and other components of the machine are adjustable relative to the position of this knife 13.

When setting up the machine to make cases using cardboards of fixed length, the stroke of the machine, i. e. the horizontal distance through which the slide table 22 reciprocates, is manually set to equal the length of the cardboard plus the length of the web between successive cardboards. This adjustment is accomplished by varying the position of the crank pin 18 while the machine is stationary.

The notching knives 12, mounted on the slide table 22, are manually set to be a predetermined distance from the lateral web severing knife 13, said distance measured at the end of the draw stroke. To accomplish the above adjustment, it is necessary to adjust the position of the slide table 22 independently of the stroke adjustment, which fixes the position of the notching knives 12. The distance is usually a multiple of the stroke length. This adjustment is accomplished by adjusting the turnbuckle link 21 after the stroke has been determined and preset.

The board pulling members 6 must also be preset a predetermined distance from the lateral web severing knife 13, at the beginning of the draw stroke portion of the cycle and a predetermined distance from the slide table 22. This may be accomplished in an existing machine by a positional adjustment at the junction of the board pullers 6 and the pull rods 24. The adjustments above described may be made on an existing casemaking machine only while the machine is not operating. Hence, if an adjustment of any of the above described machine elements is indicated, it is necessary to stop the machine, make the desired adjustments and restart the machine.

The machine described above is designed to operate with an unprinted web of case material. Attempts have been made to utilize a web of preprinted case material but these attempts have met with failure because, first, the stroke of the machine cannot be preset with sufficient accuracy and, second, no matter how printed or handled, humidity and differences of web tension during the printing process and subsequently on the casemaking machine cause sufficient variation in case lengths, as represented on the web, to introduce a progressive creep of the printed design relative to the cardboards.

An examination of a simple error requirement will also facilitate a clearer understanding of one phase of the invention. Assume, that for one reason or another, a preprinted web stretches. This elongation of the web may be considered as a certain amount of elongation per case being made. The elongation of the web will cause the printing on the successive finished cases to creep relative to the position of the cardboards, i. e. the printing, on successive finished cases, will gradually approach an edge of the finished cases. To stop the creep of the printing with respect to the cardboards, an increased amount of web material must be pulled through on each draw stroke by the clamp 23. This necessitates increasing the stroke by an amount equivalent to the amount of elongation per case in process. Concurrently, the board pulling members must be adjusted by an amount equal to the product of the elongation per case and the number of cases in process in the machine. The notching knives 12 must also concurrently be changed in position to maintain the correct distance between said knives 12 and the lateral web severing knife 13, this distance having been changed with the change in stroke. The above corrections will halt the creep of the printing.

However, the printing on a finished case will now be in a new position with respect to the cardboards, and such new position will not satisfy the desired predetermined relationship. Thus the machine is now faced with an error in position, resulting from the previously described and corrected error of rate. This positional error may then be corrected by changing the stroke to introduce a progressive controlled creep in the opposite direction, with accompanying changes in the other variables, and fixing the stroke and other variables after the desired dimensional relationship has been reobtained.

Another important consideration is that the adjustments made by the control need be of such a magnitude and character as to prevent undue spoilage of cases in process on the machine.

One important phase of the invention may be briefly described as a construction to permit manually controlled adjustments of the various elements during operation to maintain a manually controlled register relationship.

Another important phase of the invention may be briefly described as an electronic control responsive to a comparison of a plurality of control points and disposed to operate a Servo system, mechanically linked to the elements in question, to make the desired adjustments necessary for continual register during operation.

For the purposes of simplicity the control may be considered as (a) the mechanical and electrical apparatus utilized to generate the input signals to the electronic control unit; (b) the electronic control unit; (c) the mechanical and electrical apparatus responsive to the electronic control unit; (d) the means to control the scanning frequency and (e) the means to manually control the register relationship during operation. For the purposes of simplicity and convenience the above breakdown of the elements of the device will be considered individually and in the order set forth above.

(A) MECHANICAL AND ELECTRICAL APPARATUS UTILIZED TO GENERATE THE INPUT SIGNALS TO THE ELECTRONIC CONTROL UNIT

The reference criteria utilized are (1) an electrical impulse, responsive to a printed or perforated mark on the web, which indicates the position of a point on the intermittently moving web with respect to fixed location on the casemaking machine and (2) a second electrical impulse actuated by a definite setting of a moving casemaker machine element, said second impulse indicating the position of said moving casemaker machine element with respect to another fixed location on the casemaking machine.

Referring to Figs. 1, 14, 15 and 16, the web 1 of preprinted case material has thereon regularly spaced printed or perforated register marks. These register marks, if printed, should be of a color that contrasts sharply with the background material, for example, white on black, black on white, or suitable contrasting colors.

A photoelectric cell 25, responsive to a light source 26, is adjustably mounted, together with the light source 26, on a horizontal beam 27. The beam 27 separates the right and left hand portions of the main casemaker frame 28a, 28b and is supported by the angle plates 32. The pull rods 24 for the board pulling members 6 pass below the beam 27. In the presently preferred embodiment of the invention as illustrated in the drawings, the light source 26 and photoelectric cell 25 are both mounted beneath the main operating table 1a upon which the web 1 moves. It will be understood of course that the main operating table contains a suitable aperture, such as 1b, to permit the illumination from the light source 26 to reach the web 1 and be reflected into the photoelectric cell 25. In addition the aperture permits easy positional adjustment of the position of the photoelectric cell 25 and the light source 26. It is to be noted, that in the presently preferred embodiment of the invention, as illustrated, the photoelectric cell 25 is responsive to reflected light. This particular construction, utilizing light reflected from the traveling web was chosen for reasons of simplicity and ease of mounting the necessary elements. If perforated register marks on the web are used, the photoelectric cell may be mounted so as to be responsive to direct illumination rather than reflected light.

In the particular mounting used, the photoelectric cell 25 and the light source 26 are adjustably positioned within a limited range of movement to permit the utilization of various widths of web material. The photoelectric cell and light source are secured to a mounting plate 29 adjacent the beam 27. The mounting plate 29 rides in channels 30, 31 in the mounting plates 33a, 33b secured to the upper and lower surfaces of the beam 27. After being set in operative location the photoelectric cell and light source may be fixed in position by the turning of a knurled hand screw 34. The turning of this screw 34 applies pressure to the bevelled surface of a bevelled slug 35, which in turn presses against the beam 27 assuring a tight frictional contact preventing movement of the photoelectric cell 25 and the light source 26.

The photoelectric cell 25 is responsive to the change in light intensity reflected by the register mark on the preprinted web, and when so actuated, transmits a pulse to the electronic control unit. As the photoelectric cell 25 is fixed in position with respect to the casemaker frame, the pulse transmitted to the electronic control unit is indicative of the positional relationship between the web 1 of preprinted case material and a fixed point on the casemaking machine. The registry mark on the web should be so located as to pass the photoelectric cell 25 on the draw stroke portion of the cycle.

Figs. 1, 12a and 13 show the location of the elements utilized to provide the other electrical impulse for the electronic control unit. This impulse is indicative of the positional relationship of a moving element in the casemaking machine with respect to a fixed location on said machine.

To secure this second reference criteria there is provided a photoelectric cell 36 secured to a mounting plate 37 suspended from a horizontal beam 38 separating the right and left hand portions of the main casemaker frame 28a and 28b. A light source 39, disposed continually to apply a beam of light upon the photoelectric cell 36, is mounted on the main casemaker frame 28b. The path of light is disposed to be interrupted by a vertical wand 40 mounted on a sleeve 41, which in turn is slidably mounted on one of the pull rods 24. The sleeve 41 may be fixed at any desired location on the same pull rod 24 by means of set screws or other suitable fastening devices.

As the pull rods 24 reciprocate horizontally during operation, the wand 40 interrupts the path of light and the resulting electrical impulses are transmitted to the electronic control unit. This impulse is indicative of the positional relationship between a moving element of the casemaker and a fixed point on the machine.

(B) ELECTRONIC CONTROL CIRCUIT

The function of the electronic control circuit is to determine the direction of an error in register and, following such determination, to give as an output, a signal of manually controlled duration which may be used to control a motor to initiate a correction in the register.

The control circuit may be described briefly as including two separate input channels, independent of each other except at a point where impulses from each channel are applied to the other channel. In each of these channels the input pulses are amplified and squared. The output of the amplication stages in each channel are used to trigger a pulse forming multivibrator in each channel. The output pulse of each multivibrator is applied to the gate circuit in the other channel. The output pulse of each multivibrator is also differentiated and applied to the gate circuit in its own channel. The gate circuits will operate only when both pulses, i. e. the output pulse from the multivibrator in the other channel and the differentiated pulse from the multivibrator in its own channel, are impressed simultaneously. Thus, the leading pulse is stopped at this point and never reaches the end of its own channel, but it does assist the lagging pulse to complete the journey to the end of its respective channel to operate a relay at that point. Thus, the control can decide whether the web leads or lags the machine elements and can correct accordingly by actuating the proper relay.

Figure 17:
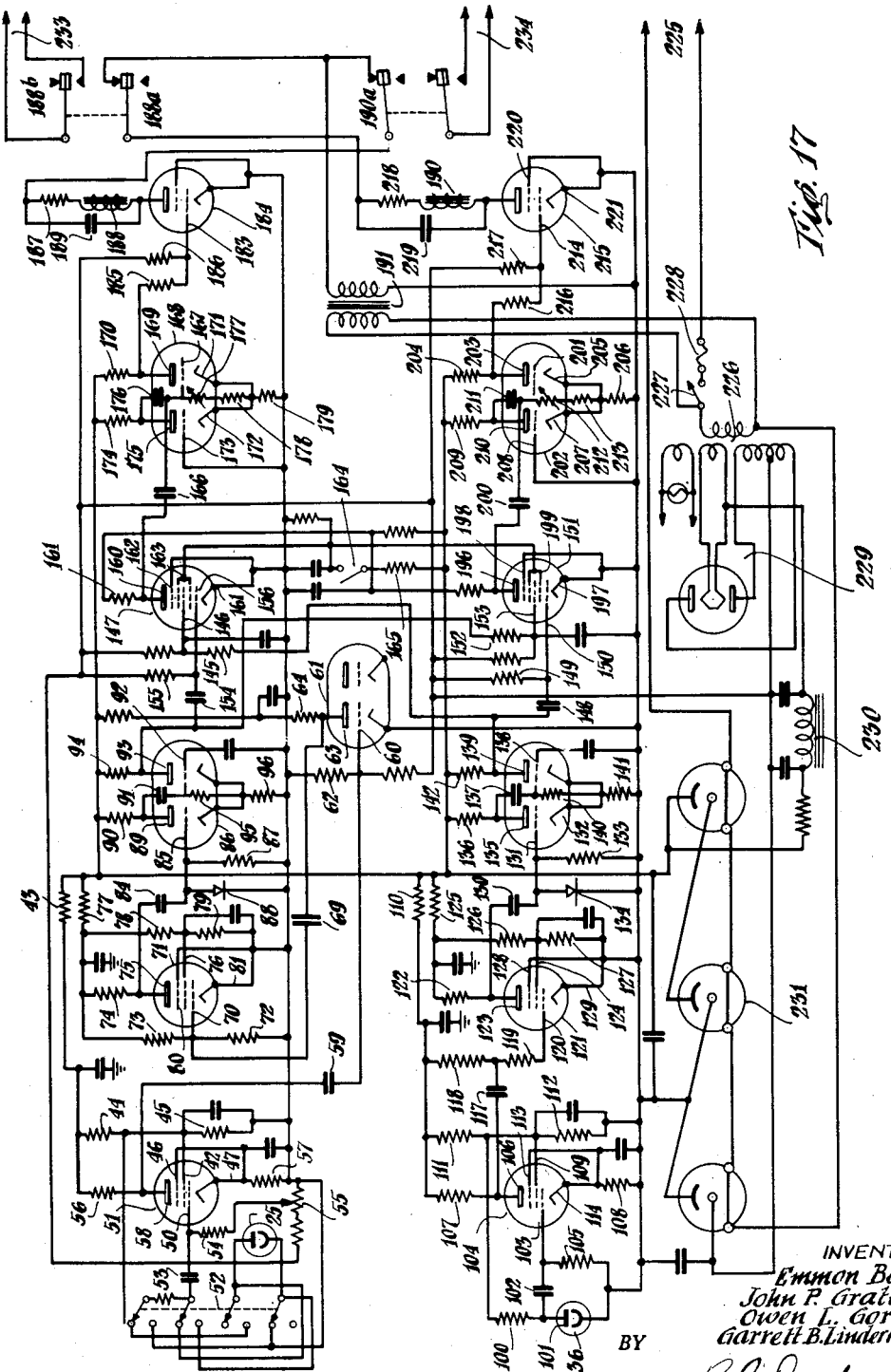
Fig. 17 is a wiring diagram of the electronic control.

Fig. 17 shows the circuit diagram of the presently preferred control circuit.

The web scanning photoelectric cell 25 is electrically connected to the web scanning channel through a gang switch 52. The leads to the switch 52 are so arranged to transmit a negative pulse, of a duration determined by the width of the registry marks on the web being scanned, through the coupling condenser 53 for both the case of a dark registry mark on a light background and the case of a light registry mark on a dark background. The position of the switch 52 as illustrated in the drawing is set to accommodate a light registry mark on a dark background. The switch 52 is manually preset prior to operation after visual examination of the web. The negative pulse, after its passage through the coupling condenser 53, appears across the grid biasing circuit of the first amplifying tube 51 comprising the grid biasing resistor 54 and a portion of the biasing potentiometer 55 and consequently on the grid 50.

The tube 51 is normally conducting and the current flow through the plate load resistor 56, the tube 51 and the cathode biasing resistor 57, results in a voltage drop across the plate load resistor 56 holding the plate 58 at a potential below the normal supply voltage. The negative pulse on the grid 50 is of sufficient amplitude to reduce the current flow through the tube 51. This reduction in current flow results in a rise in potential on the plate 58. The removal of the pulse from the grid 50 permits the current through the tube 51 to rise to its normal value with its consequent decrease in the plate voltage. Thus the application of the negative pulse to the grid 50 of the first amplifying tube 51 results in an amplified positive pulse of equal duration appearing on the plate 58. The potential of the screen grid 42 is obtained through a voltage divider network including resistors 43, 44, 45. The suppressor grid 46 is connected to the cathode 47.

The positive pulse appearing on the plate 58 passes through a coupling condenser 59 and is applied to the grid 60 of the second amplifying tube 61 across the grid biasing resistor 62. The tube 61 is normally cut off and the potential on the plate 63 is the supply potential. The positive pulse on the grid 60 starts the tube to conduct. The voltage drop occasioned by the current flow through the plate load resistor 64 results in a decrease in the potential on the plate 63. The removal of the pulse from the grid 60 cuts the tube off and the plate potential rises to the supply voltage. The application of the positive pulse to the grid 60 therefore results in an amplified negative pulse of equal duration appearing on the plate 63.

The negative pulse on the plate 63 passes through a coupling condenser 69 and is applied to the grid 70 of the third amplifying tube 71 across the biasing resistor 72 which is included in a voltage dividing network comprising resistors 72, 73. This tube 71 is normally conducting and the voltage drop across the plate load resistor 74, occasioned by the current flow, keeps the potential of the plate 75 below that of the supply voltage. The application of the negative pulse to the grid 70 drives the tube 71 beyond cut-off and the cessation of current flow results in a rise in the potential on the plate 75 to that of the supply voltage. The removal of the negative pulse from the grid 70 permits the tube to reconduct, with a consequent drop in plate potential. Since the negative pulse in this stage drives the tube beyond cut-off, a positive pulse, approximately rectangular in shape, appears on the plate 75. The potential on the screen grid 76 of tube 71 is obtained through voltage dividing network including resistors 77, 78 and 79. The suppressor grid 80 and the cathode 81 are at ground potential.

The shaped positive pulse appearing on the plate 75 of the third amplifying tube 71 passes through a coupling condenser 84 and is applied to the grid 85 of the first half of the dual tube 86 across a grid biasing resistor 87.

A crystal bypass 88 is included to provide a low resistance path to ground for any negative components present in the circuit. In so doing it provides a means of returning the potential of the grid 85 to a steady state in a short period of time.

The dual tube 86 and its allied circuits form a multivibrator. The first section of the tube 86 is normally cut off and the potential on the plate 89 is that of the supply voltage. When the positive pulse is impressed on the grid 85, the first half of the tube 86 starts to conduct. The current flow results in a voltage drop across the plate load resistor 90 which is reflected in an abrupt drop in potential on the plate 89. This drop in plate voltage is impressed upon the coupling condenser 91 and the grid 92 of the second half of the tube 86, causing the second half of the tube 86, which is normally conducting, to be cut off. The abrupt cutting off of the second half of the tube 86 causes the potential on the plate 93, which was lower than the supply potential during the conducting period, due ot the voltage drop across the plate load resistor 94, to rise sharply to the supply potential. The second half of the tube 86 will remain cut off until the charge on the coupling condenser bleeds off through the resistors 95, 96. However, until the grid 92 reaches a point where conducting may begin the potential on the plate 93 will remain at the supply potential. Thus the application of the positive pulse to the grid 85 results in an approximately rectangular pulse on the plate 93 of the second half of the dual tube 86. The duration of the pulse appearing on the plate 93 is determined by the time necessary for the charge on the coupling condenser 91 to bleed off through the resistors 95, 96.

Since this pulse is applied to gate circuits in both the web scanning channel and the machine scanning channel, it would be well at this time to examine the initial stages of the machine scanning channel.

The machine scanning photoelectric cell 36 is normally conducting and the voltage drop across the plate load resistor 100, occasioned by the current flow, keeps the potential of the anode 101 below that of the supply potential. The momentary interruption of the path of light results in momentary cessation of current flow with an accompanying rise in the potential of the plate 101 to the supply potential. The positive pulse thus formed passes through the coupling condenser 102 and is applied to the grid 103 of the first amplifying tube 104 across the grid biasing resistor 105. The tube 104 functions as a Class A amplifier and the application of the positive pulse to the grid 103 causes a drop in the potential upon the plate 106 due to the increased voltage drop across the plate load resistor 107, which in turn is occasioned by the increased current flowing through said resistor 107, the tube 104 and the cathode biasing resistor 108. The application of the positive pulse to the grid 103 thus results in a negative pulse of greater amplitude appearing on the plate 106. The potential of the screen grid 109 is obtained through a voltage dividing network including resistors 110, 111 and 112. The suppressor grid 113 is connected to the cathode 114.

The negative pulse appearing on the plate 106 passes through a coupling condenser 117, through a resistor 119 which resistor together with resistor 118 forms a voltage dividing network, and is applied to the grid 120 of the second amplifier tube 121. The tube 121 is normally conducting and the voltage drop across the plate load resistor 122 keeps the potential on the plate 123 below the supply potential. The negative pulse appearing on the grid 120 cuts the tube off and the potential or the plate rises to that of the supply potential and remains at that potential until the negative pulse on the grid 120 is removed. Thus the application of the negative pulse to the grid 120, in cutting off the tube, causes an approximately rectangular pulse to appear on the plate 123. The potential on the screen grid 124 is obtained through a voltage dividing network including resistors 125, 126 and 127. The suppressor grid 128 and the cathode 129 are grounded.

The shaped positive pulse appearing on the plate 123 of the second amplifying tube 121 passes through a coupling condenser 130 and is applied to the grid 131 of the first half of a dual tube 132 across a grid biasing resistor 133.

A crystal bypass 134 is included to provide a low resistance path to ground for any negative components present in the circuit. In so doing, it provides a means of returning the potential of the grid 131 to a steady state in a short period of time.

The dual tube 132 and its allied circuits form a conventional multivibrator. The first section of the tube 132 is normally cut off and the potential on the plate 135 is that of the supply voltage. When the positive pulse is impressed upon the grid 131, the first half of the tube 132 begins to conduct. The current flow results in a voltage drop across the plate load resistor 136, which is reflected in an abrupt drop in the potential of the plate 135. This drop in plate potential is impressed upon a coupling condenser 137 and the grid 138 of the second half of the dual tube 132, causing the second half of the tube, which is normally conducting, to be cut off. The abrupt cutting off of the second half of the dual tube 132 causes the potential on the plate 139, which was lower than the supply potential during the conducting period, due to the voltage drop across the plate load resistor 142, to rise to that of the supply potential. The second half of the dual tube 132 will remain cut-off until the charge upon the coupling condenser 137 bleeds off to ground through resistors 140 and 141. However, until the grid 138 reaches a potential which will permit the second half of the dual tube 132 to conduct, the potential upon the plate 139 remains that of the supply potential. Thus, the application of a positive pulse upon the grid 131 of the first half of the tube 132 results in a positive pulse of longer duration upon the plate 139 of the second half of the dual tube 132. The duration of the pulse appearing on the plate 139 is determined by the time necessary for the charge on the coupling condenser 137 to bleed off through the resistors 140, 141, and is relatively long in duration.

In the above examination we have described the circuits of both the web scanning channel and the machine scanning channel up to the gate stages. We will now consider in detail the construction and operation of the gate circuits, which perform the function of determining the relative positions of the received pulses and initiate the desired corrective measures.

The positive pulse appearing on the plate 139 of the second half of the tube 132 in the machine scanning channel is applied, through a resistor 145, to a control grid 146 of the gate tube 147 in the web scanning channel. The pulse is also differentiated by a peaking circuit including the coupling condenser 148 and the resistor 149 and applied to a control grid 150 in the gate tube 151 in the machine scanning channel. Thus, the positive pulse of long duration obtained from the plate 139 of the second half of the dual tube 132 of the machine scanning channel is applied without change in shape to the gate tube 147 in the web scanning circuit and, after peaking, the narrow resulting pulse is applied to the gate tube in the machine scanning circuit.

The positive pulse appearing on the plate 93 of the second half of the tube 86 in the web scanning channel is applied without change in shape through a resistor 152 to a control grid 153 of the gate tube 151 in the machine scanning channel. This pulse is also differentiated by a peaking circuit including the coupling condenser 154 and the resistor 155. The narrow resulting positive pulse, after peaking, is applied to a control grid 156 in the gate tube 147 in the web scanning channel.

The gate tubes 147 and 151 are both normally biased beyond cut-off and in order to bring them to a conducting state it is necessary for both the control grids in either tube to go positive at the same time. Thus it will be seen that only a lagging pulse in either circuit will be able to cause the gate tube in that circuit to conduct. For example, assume the web scanning pulse to lead the machine pulse by a short interval of time. This will cause a peaked pulse of very short duration to be applied to the gate tube 147 in the web scanning channel and a long pulse to be applied to the gate tube 157 in the machine scanning circuit. The lagging machine pulse will apply a pulse of long duration to the gate tube 147 in the web scanning circuit. However, this pulse will not cause the gate tube 147 to fire as the leading peaked pulse of short duration from the web scanning circuit will no longer be on the grid 156 of the gate tube 147. The lagging machine pulse will, however, apply a peaked pulse of short duration to the grid 153 of the gate tube in the machine scanning circuit and this in conjunction with the long pulse on the other control grid 153, i. e. the one previously obtained from the web scanning channel, will cause the gate tube 151 to conduct for as long as the peaked pulse is applied to the tube.

If the web scanning pulse lags the machine pulse, the gate tube 147 in the web scanning channel will fire to the exclusion of the gate tube 151 in the machine scanning circuit.

If both the web scanning pulse and the machine scanning pulses are together in time, i. e. in phase, both gate tubes will conduct.

We will now continue with a description of the remainder of the web scanning channel.

The gate tube 147 in the web scanning channel is normally non-conducting. The potential on the plate 160 is therefore that of the supply voltage. When the long duration positive pulse from the machine scanning circuit is applied to the control grid 146 and a peaked pulse of short duration is applied to the control grid 156 while the long duration pulse is still applied to the grid 146, the tube will conduct. The voltage drop across the plate load resistor 161, occasioned by the current flow, will cause the potential on the plate 160 to drop. The tube will conduct as long as both the pulses are present on the grids. In effect, this means that the short duration pulse will control the duration of the firing of the tube and, as a result, a negative pulse of a duration equal to the duration of the short positive pulse on the grid 156 will appear on the plate 160. The cathode 161 and suppressor grid 162 are grounded. The screen grids 163 are connected to supply voltage through a switch 164 and a dropping resistor 165.

The negative pulse appearing on the plate 160 of the gate tube 147 passes through a coupling condenser 166 and is applied to the grid 167 of the second half of the dual timing tube 168. This section of the tube 168 is normally conducting heavily and the potential on the plate 169 is lower than the supply voltage due to the voltage drop across the plate load resistor 170. The cathode 171 is above ground potential due to the voltage drop across the cathode biasing resistor 179. Impressing the negative pulse upon the grid 167 cuts the tube off and the cessation of current flow occasions a rise in the potential of the plate 169 and a drop in the potential of the cathode 171. The drop in cathode potential, however, permits the first half of the tube 168, which is normally cut off, to conduct, by lowering the potential on the cathode 172 to a potential equal to that of the grounded grid 173. When the first half of the tube 168 conducts the voltage drop across the plate load resistor 174 causes the potential on the plate 175 to drop. This drop in potential is applied to the grid 167 of the second half of the tube 168 through the coupling condenser 176 and keeps the second half of the tube cut-off. However, the charge on the coupling condenser 176 leaks off through the variable resistor 177, and resistors 178, 179 at a rate determined largely by the variable resistor 177. When the negative charge on the coupling condenser 176 is dissipated the second half of the tube resumes conduction with its consequent drop in plate potential. Thus, the application of a negative pulse of short duration to the grid 167 results in a rectangular positive pulse on the plate 169. The duration of this positive pulse is manually controlled by the variable resistor 177. The duration of this pulse determines the time during which the corrective adjustments of the machine elements will be operative to correct for a lagging web.

This positive rectangular pulse is applied to the control grid 183 of a gas tetrode 184 through a dropping resistor 185. The grid 183 is normally held below the cut-off potential by a circuit through resistor 186 which is connected to the negative supply. The tetrode 184 is normally cut off and the impression of the positive rectangular pulse upon the grid 183 is sufficient to permit conduction. The plate circuit of the tube 184 includes a plate load resistor 187 and a relay coil 188 both paralleled by a condenser 189. The plate circuit is connected through a normally closed relay contact 190a to the secondary of a transformer 191 which provides an alternating supply voltage. The tetrode 184 will conduct on each positive half cycle of the supply voltage and a pulsating direct current will flow in the plate circuit energizing the relay coil 188 which closes the relay contacts 188a, 188b. These contacts will remain closed until the positive rectangular pulse is removed from the grid 183 and the plate voltage drops to a value that will not support conduction, thus cutting the tetrode 184 off. The screen grid 192 and the cathode 193 of the gas tetrode 184 are both grounded.

The closing of the relay contacts 188a opens the plate circuit of the gas tetrode 215 in the machine scanning channel. The closing of the relay contacts 188b closes a circuit in a motor reversing switch. The leads 233 lead to said motor reversing switch (see Fig. 18).

We will now examine the remaining portions of the machine scanning channel.

The gate tube 151 in the machine scanning channel is normally non-conducting. This tube will only conduct when both the grid 153 and the grid 150 are positive. An approximately rectangular, long duration pulse, obtained from the plate 93 of the second half of the dual tube 86 in the web scanning channel is applied to the grid 153. If the peaked pulse of short duration obtained from the plate 138 of tube 132 and peaked by condenser 148 and resistor 149 is applied to the control grid 150 while the rectangular pulse is still present on the control grid 153, the tube will conduct and a negative pulse of short duration will appear on the plate 196 of the tube 151. It should be noted at this point that the gate tube 151 operates in exactly the same manner as the gate tube 147 in the web scanning channel. The cathode 197 and suppressor grid 198 are grounded. The screen grids 199 are connected to the supply voltage through the switch 164 and the dropping resistor 165.

The negative pulse appearing on the plate 196 passes through a coupling condenser 200 and is applied to the grid 201 of the second half of a dual timing tube 202. This section of the tube 202 is normally conducting heavily and the potential on the plate 203 is lower than the supply voltage occasioned by the voltage drop across the plate load resistor 204. The cathode 205 is held above ground potential by the voltage drop across the cathode biasing resistor 206. Impressing the negative pulse upon the grid 201 cuts the tube off and the cessation of current flow occasions a rise in the potential of the plate 203 and a drop in the potential of the cathode 205. The drop in cathode potential, however, permits the first half of the tube 202, which is normally cut off, to conduct, by lowering the potential on the cathode 207 to a potential equal to that of the grounded grid 208. When the first half of the tube 168 conducts, the voltage drop across the plate load resistor 209 causes the potential on the plate 210 to drop. This drop in potential is applied to the grid 201 of the second half of the tube 202 through a coupling condenser 211 and keeps the second half of the tube cut off. However, the charge on the coupling condenser 211 leaks off through the variable resistor 212 and the resistors 213, 206 at a rate determined largely by the variable resistor 212. When the negative charge on the coupling condenser 211 is dissipated, the second half of the tube resumes conduction with a consequent drop in plate potential. When the second half of the tube starts to conduct the cathode potential rises and this rise in cathode potential cuts off the first half of the tube. Thus, the application of a negative pulse of short duration to the grid 201 results in a rectangular positive pulse on the plate 203. The duration of this positive pulse is manually controlled by the variable resistor 212. The duration of this pulse determines the time during which the corrective adjustments of the machine elements will be operative to correct for a lagging machine element.

The positive rectangular pulse is applied to the grid 214 of a gas tetrode 215 through a dropping resistor 216. The grid 214 is normally held below the cut off potential by a circuit through the resistor 217 which is connected to the negative supply. The tube is normally cut off and the impression of positive rectangular pulse on the grid 214 initiates conduction. The plate circuit of the tube 215 includes a plate load resistor 218 and a relay coil 190, both paralleled by a condenser 219. The plate circuit is connected through a normally closed relay contact 188a to the secondary of the transformer 191 which provides an alternating supply voltage. The tetrode 215 will conduct on each positive half cycle of the supply voltage and a pulsating direct current will flow in the plate circuit energizing the relay coil 190 which closes the relay contacts 190a, 190b. These contacts will remain closed until the positive rectangular pulse is removed from the grid 214 and the plate voltage drops to a value that will not support conduction, thus cutting the tetrode 215 off. The screen grid 220 and the cathode 221 are both grounded.

The closing of the relay contacts 190a opens the plate circuit of the gas tetrode 184 in the web scanning channel. The closing of the relay contact 190b closes a circuit in a motor reversing switch. The leads 234 lead to said motor reversing switch (see Fig. 18).

Thus it will be seen that the relay contacts 188a and 190a provide an interlock circuit which prevents both tetrodes from conducting at the same time.

The relay contacts 188b and 190b are included in the circuit of a motor reversing switch and in effect control the direction of operation of a motor. This feature will be examined in detail at a later point.

The power for the electronic control is obtained from a standard 110 volt A. C. supply 225 connected to the primary of the power transformer 226 through a switch 227 and a fuse 228. The primary of the power transformer 226 is paralleled by the primary of the transformer 191. The secondary of the transformer 191 supplies the alternating plate potential for the gas tetrodes 184, 215 in both the web scanning and the machine scanning circuits. A full wave rectifier, designated generally as 229, a filter designated generally as 230 and a voltage regulating system, designated generally as 231, all of standard construction, complete the power supply for the unit.

The electronic control unit described is the presently preferred form; however, it is possible to modify the disclosed circuits to accomplish similar results. For example, circuits may be devised wherein the amplitude of the pulses rather than the duration would control the gate circuits.

(c) MECHANICAL AND ELECTRICAL APPARATUS RESPONSIVE TO THE ELECTRONIC CONTROL UNIT

The mechanical and electrical apparatus responsive to the electronic control unit comprises all elements which actuate and operate the necessary adjustments on the case-making machine. These may be further subdivided into (1) the driving system for the corrective apparatus; (2) the stroke adjustment; (3) the notching knife adjustment and (4) the board puller adjustment. For the purposes of simplicity, the elements in the above breakdown will be considered individually and in the order set forth above.

(1) *The driving system for the corrective apparatus*

Fig. 18 is a schematic diagram of the driving system for the corrective apparatus. The leads 233 are connected to the relay contacts 188b (see Fig. 17). When the relay contacts 188b close, a circuit is completed in the motor reversing switch 235 which controls the direction of turning of the main motor 236. In a smiliar manner the leads 234 are connected to the relay contacts 190b (see Fig. 17). When the relay contacts 190b close, a second circuit is completed in the motor reversing switch 235, each of said circuits controlling unidirectional operation of the motor 236.

The motor reversing switch 235 is a standard three phase motor reversing contactor of sufficient size to carry the motor loads without burning the relay points. This contactor is solenoid operated and contains a mechanical interlock to prevent closing both circuits at one time. As mentioned generally above, the relay contacts 188b and 190b (see Fig. 17) are used to close the solenoid circuits in the reversing contactor and the wiring of these contacts is so arranged as to reverse two leads of the three phase motor 236.

The three phase motor 236 supplies the power required to make the mechanical adjustments necessary for continual register. A three phase motor was selected because of the ease by which it could be reversed. The direction of rotation of this motor depends upon which of the solenoids in the motor reversing switch 235 have been energized.

Connected to the motor 236 by a driving V-belt 237 is a servo mechanism generator, such as a suitable Selsyn generator, designated schematically at 238, of the size sufficient to permit three servo mechanism motors, such as suitable Selsyn motors designated schematically as 239a, 239b, 239c to be connected in parallel to it. In the presently preferred embodiment of the invention as illustrated in the drawings, a Selsyn system is used. However, other suitable servo mechanisms may be utilized without departing from the spirit of the invention. The three Selsyn motors 239a, 239b, 239c are identical in construction and are utilized to provide the drives for the necessary adjustments. A Selsyn system is utilized because it permits the transmission of electrical power through cables to moving parts which cannot be reached by mechanical connections, because it provides a self synchronous system which will not get out of step and because it permits adjustment of the various elements while the machine is operating.

(2) *The stroke adjustment*

Figs. 1, 4, 5, 6 and 7 show the mechanism used to vary the stroke of the machine. Fig. 1 shows generally positional relationship of the multiplier link 20 by which the stroke of the machine is adjusted. Figs. 4, 5, 6 and 7 show in detail the mechanism by which the stroke may be adjusted during operation.

The multiplier link 20 comprises a frame 240 bifurcated at its upper and lower ends. The lower end 20a terminates in sleevelike bearing members 241 disposed to encompass a fixed shaft. The upper end has, traversing the bifurcated portion thereof, a shaft 242 having mounted thereon connecting members 243, 243a, the upper segments of which are internally threaded and encompass the threaded end portions 244a, 245a of the shafts 244, 245 of the structural turnbuckle link 20 (see Fig. 1).

As mentioned before, the multiplier link 20 is driven in angular oscillation about its fixed lower end 20a by a connecting rod 19. The stroke length, which formerly could be varied only by changing the position of the crank pin 18 while the machine was stationary, may now be varied during operation by the added structures of the invention by changing the position of a slide block 246 which is slidably mounted on the frame 240. The connecting rod 19 is joined to the slide block 246 by the connecting member 247 and the transverse pin 248. The vertical positioning of the slide block 246 determines the angular displacement of the multiplier link 20 about its fixed lower end 20a and hence determines the length of stroke.

To provide for automatic positioning of the slide block 246, there is provided a Selsyn motor 239a (see Fig. 18) mounted adjacent the lower end 20a on the frame member 240. A sprocket 249 keyed to the shaft 250 of the Selsyn motor 239a, drives a larger sprocket 251 on a shaft 253 by a chain 252 encompassing both said sprockets 249, 251. Mounted adjacent to the large sprocket 251 on the shaft 253 is a small gear 254 which drives a larger gear 255 mounted on a shaft 256 supported by the mounting plates 257, 258. Mounted on the shaft 256 is a worm 259 disposed to engage a worm gear 260 secured to a vertical shaft 261. The vertical shaft 261 is rotatably seated at 262, 263 to the frame 240. The upper portion of the shaft 261 is threaded at 264 and engages a threaded aperture 265 on the top plate 266 of the slide block 246.

Thus, as the Selsyn motor 239a turns in response to the Selsyn generator, as shown in Fig. 18, the motion is transmitted through a mechanical linkage including sprockets 249, 251, gears 254, 255, worm 259 and worm gear 260 imparting rotary motion to the vertical shaft 261 which in turn raises or lowers the slide block 246 depending on the direction of rotation of said shaft 261.

The raising and lowering of the slide block 246 varies the distance from the center of angular rotation, i. e. the fixed lower end 20a of the frame 24, at which the moving force, transmitted through connecting rod 19, is applied. Lowering the slide block 246 will increase the angular displacement of the multiplier link 20 about its fixed lower end 20a, resulting in an increase in the stroke length. Raising the slide block 246 will result in a decrease in the stroke.

The gear 255 may be disengaged from the gear 254 to permit dissociation of the Selsyn drive from the slide block 246.

(3) *Notching knife adjustment*

Figs. 1, 8, 9 and 10 show the mechanism used to vary the position of the notching knives during operation. Fig. 1 shows generally the mounting of the notching knives 12 on the slide table 22. The register position of the notching knives 12 is a predetermined distance from the lateral web severing knife 13 measured at the end of the draw stroke portion of the cycle. The positioning is accomplished by an adjustment of the structural turnbuckle link 21. It will be understood that the setting of the structural turnbuckle link controls the positioning of the slide table 22 but since the notching knives 12 are mounted on said slide table 22 their position is also fixed.

Figure 10:
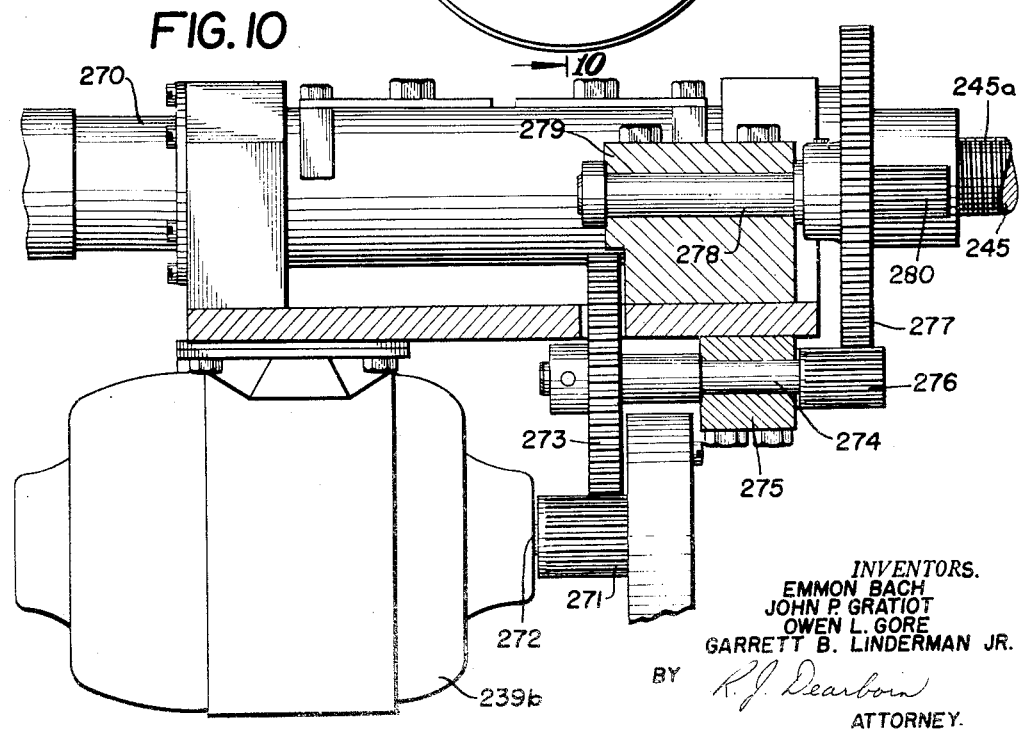
Fig. 10 is a vertical section on the line 10—10 of Fig. 9.

Figs. 8, 9 and 10 show in detail the mechanism by which the notching knives 12 are positioned. The structural turnbuckle link 21 comprises a dual body portion or frame 270, each body portion encompassing a shaft 244, 245. The ends of these shafts 244, 245 are threaded with threads of opposite pitch and are designated 244a, 244b and 245a, 245b, respectively. The threaded end portions 244a and 245a are joined to the threaded connecting members 243, 243a (see Figs. 1 and 8) which structurally join said shafts to the upper portion of the multiplier link 20. The threaded end portions 244b and 245b are joined to the threaded connecting members 267, 267a (see Fig. 1) which structurally join said shafts to the slide table 22. (It will be noted that Fig. 1 shows only connecting member 267, but it will be understood there is a like member 267a on the opposite side of the slide table 22.)

The opposing pitch characteristics of the threaded end portions 244a, 244b, 245a, 245b are suitably designed to effectively adjust the distance between the connecting members 243, 243a and 267, 267a (see Fig. 1) by moving said pairs of members closer or farther apart as the shaft is rotated.

To provide for automatic positioning of the notching knives 12 there is provided a Selsyn motor 239b (see Fig. 18) mounted on the underside of the structural turnbuckle link 21 between the individual members of the dual body portion or frame 270. A gear 271 keyed to the shaft 272 of the Selsyn motor 239b drives a larger gear 273 mounted on a shaft 274. The shaft 274 is supported in a bearing block 275 secured to the frame 270. A small gear 276 is keyed to the other end of the shaft 274 and drives a larger gear 277 keyed to a shaft 278. The shaft 278 is supported in a bearing block 279 secured to the frame 270. A small gear 280, positioned adjacent to the large gear 277 on the shaft 278, drives a larger gear 281. The gear 281 encompasses the threaded portion 244a of the shaft and internal threads 281a on the gear 281 engage the threads on the shaft 244. The gear 281 may rotate freely, but movement in a direction parallel to its axis is prevented by the frame 270 and a face plate 282.

By the above described gear train, including gears 271, 273, 276, 277, 280 and 281, the rotary motion of the Selsyn motor 239b is transmitted into rotary motion of the threaded shaft 244. The shaft 244 is an integral unit and contains threaded portions 244a and 244b adjacent the ends. As the threads on the threaded portion 244a are of opposite pitch from the threads of the threaded portion 244b, any rotation of the shaft is reflected in a movement of the connecting members 243, 243a and 267, 267a (see Fig. 1) towards or away from each other. The movement of the connecting members provides the necessary adjustments in the positioning of the notching knives 12.

As illustrated in the drawings the motion of the Selsyn motor 239b is transmitted through the gear train to the shaft 244. The rotary movement of the shaft 244 is transmitted to the shaft 245 by a gear train including gears 283 through 286, gear 283 being driven by the shaft 244 and the shaft 245 being driven by the gear 286. By this gearing arrangement any rotary motion of the shaft 244 causes concurrent rotary motion of the shaft 245.

The gear 281 may be disengaged from the shaft 244 by releasing the lock mechanism 282a, to permit manual adjustment by the hand wheel 287.

(4) Board puller adjustment

Figs. 1, 11, 12 and 13 show the mechanism used to vary the position of the board pullers. Fig. 1 shows generally the mounting of the board pulling members 6, the pull rods 24 connected thereto and the junction of the pull rods 24 with the slide table 22. The adjustment to be made according to the principles and structure of this invention takes place at the slide table and varies the position of the pull rods 24 with respect to the slide table 22. The structure at the juncture of the pull rods 24 and the slide table 22 permits adjustment of the board pulling members 6 while the machine is in operation.

Figs. 11, 12 and 13 show in detail the mechanism by which the board pullers are positioned. To provide for automatic positioning of the pull rods 24, there is provided a Selsyn motor 239c (see Fig. 18) mounted on the underside of the slide table 22. A small gear 290, keyed to the shaft 291 of the Selsyn motor 239c, drives a larger gear 292. The larger gear 292 is mounted on a shaft 293 which is supported by a bearing block 294. A small gear 295 mounted on the shaft 293 adjacent the gear 292 and turning in conjunction therewith drives a larger gear 296. The gear 296 is secured to a shaft 297 which is supported in a bearing box 298. Mounted on the opposite end of the shaft 297 is a driving sprocket 299. Through a chain 300, the sprocket 299 drives sprockets 301, 302 which are mounted in bearing boxes 303, 304 and control the position of the pull rods 24. Idler sprockets 305, 306 are provided to tension the chain 300. The sprockets 301, 302 encompass the pull rods 24 and internal threads on said sprockets engage the threads 307 adjacent the end portion of the pull rods 24. The sprockets may rotate freely but are kept from any motion parallel to their axes by the collars 308, 309. Hence as the sprockets 301, 302 rotate, their internal threads engage the threaded end portions 307 of the pull rods 24 and cause said pull rods to move longitudinally.

As the Selsyn motor 239c rotates in response to the Selsyn generator, as shown in Fig. 18, the rotary motion is transmitted to the sprockets 301, 302 through the gear train, including gears 290, 292, 295, 296, the driving sprocket 299 and the chain 300. As the sprockets 301, 302 rotate, the pull rods 24 move laterally as a unit, thus adjusting the position of the board pulling members 6 at their ends.

A knurled disconnect knob 308 is provided to disengage the Selsyn system by removing the mechanical linkage to the driving sprocket 299 for manual control and adjustment.

(D) Means to Control the Scanning Frequency

To a certain degree, the operation of this register control is governed by the means employed in printing the web case material. For example, if the web is manufactured on a printing press which prints four cases for every revolution of the printing press cylinder, the register control should examine for register only once every four cases. Were it to do otherwise, and say, examine every case for register, errors of printing plate imposition would be detected. Because a casemaking machine of the web fed type is normally operating on about fifteen or more cases at once, it would be impossible for the machine to correct for errors of this nature. In general it is desirable for the control to examine the web once for each revolution of the printing press cylinder irrespective of how many impressions are printed on each revolution.

If for each case printed on the web there is a register mark, the web channel of the electronic control will receive one impulse on each cycle of the machine, i. e. during the draw stroke. The machine channel will, however, receive two impulses for each cycle, one on the draw stroke and another on the return stroke. In order to prevent the electronic control from trying to register to the machine impulse generated on the return stroke and to permit the control to examine the register at periodic intervals, a cam operated microswitch is added to the system to render the detecting part of the control inoperative during the return half of the cycle.

Figs. 1 and 3 show in detail the position and actuation of this switch. A cam 310 mounted on a geared shaft 311 is disposed to be rotated one complete revolution for every twelve cycles of the machine by a worm 312. The worm is mounted on a horizontal shaft 313 terminated at one end by a sprocket 314. The sprocket 314 is encompassed by a chain 315 and is driven by a suitable connection on the main cycle shaft 17. The moving arm of the switch 316 is terminated by a roller 317 which rides on the surface of the cam 310. Suitable depressions such as 318, on the cam surface cause the microswitch to make and break contact. The electrical circuit of the microswitch is included in the screen circuits of the gate tubes 147, 151 (see Fig. 17) and is designated there as switch 164. This switch 164 controls the voltage applied to screen grids 163 and 199 of gate tubes 147 and 151 respectively. When switch 164 is open the above grids are disconnected from the supply potential, thus blocking both tubes so that no pulses are transmitted to the following multi-vibrator circuits. The switch 164, when open, thus effectively renders the electronic control inoperative.

The surface of the cam 310 may be designed to afford any desired degree of control. Since the cam 310, or any cam mounted on the shaft 311, makes one complete revolution for every twelve cycles of the machine, and significant register marks appear every cycle, a cam with twelve dips on it would be used. This cam would activate the control during each draw stroke.

If, for example, a web with a significant register mark appearing on every other cycle of the machine is used, a cam having six dips, as shown in the drawings, is required. This cam would activate the control during every other draw stroke and would deactivate the control for both of the return strokes and the one draw stroke therebetween. By a proper shaping of the surface of the cam 310 all possible eventualities may be considered.

(E) MEANS TO MANUALLY CONTROL THE REGISTER RELATIONSHIP DURING OPERATION

An important phase of the invention is the feature whereby the electronic control may be disconnected and the register relationship be maintained by a system of manual controls. The manual control system may be used to control the register relationship entirely apart from the electronic control unit and is of particular value in assisting the operator in making large corrections in obtaining the register relationship. This is of particular importance in the initial operation, i. e. immediately following the setting up of the machine, in order to avoid spoilage of an excessive number of cases.

Fig. 18 shows schematically the switching system used for manual control. Switch 319 serves to disconnect the electronic control unit from the motor reversing switch 235 by opening the leads 233, 234. Switch 320 is included to manually control the motor reversing switch 235, which in turn controls the direction of rotation of the motor 236. Switch 320 is so arranged as to permit the rotation of motor 236 in either direction for a period of time determined by the manual operation of said switch 320.

The adjustments of the machine elements operate in the manner described above.

It will now be seen that the device satisfies the several objects described at the outset of this specification and there is provided a completely automatic device, having alternative provision for manual control, to examine the register of a preprinted web of case material and the applied cardboards, to sense the correction needed if out of register, and to initiate and carry through the needed corrective adjustments while the machine is in operation, thus providing a completely automatic device to permit the use of preprinted webs of case material in the manufacture of hard casings for books.

In accordance with the provisions of the patent statutes, we have herein described the principle of operation of this invention, together with the elements which we now consider the best embodiments thereof, but we desire to have it understood that the structure disclosed is only illustrative and the invention can be carried out by other means. Also, while it is designed to use the various features and elements in the combination and relations described, some of these may be altered and modified without interfering with the more general results outlined and the invention extends to such use within the scope of the appended claims.

We claim:

1. A register control apparatus for controlling the application of successive cover stiffening elements in a predetermined longitudinal register relationship with printed matter on a web in a machine for making casings for books wherein a web of binding material having spaced printed matter on one side thereof is intermittently advanced along an operating table having a plurality of operating stations spaced longitudinally thereof, which include, a fixed knife for severing the web into individual casings, a web advancing clamp reciprocating horizontally through an amplitude which is desired to be controlled, a horizontally reciprocating cover board applicator connected to said clamp for drawing cover stiffening elements into spaced engagement with the advancing web and moving to and from a limit which is desired to be controlled in spacing relative to said clamp and to said web severing knife, and vertically reciprocating notching knives connected to said clamp for introducing folding notches in the edges of the web intermediate successive cover stiffening elements and moving to and from a limit which is desired to be controlled in spacing relative to said web severing knife, comprising, in combination, means for varying the amplitude of horizontal reciprocation of said clamp, means for varying the spacing between said cover board applicator and said clamp, means for varying the spacing between said clamp and said web severing knife independent of said amplitude varying means, sensing means for providing an indication of the time relation between the passage of predetermined locations on the web and on the cover board applicator past stationary points on the machine, said time relation being indicative of a departure from the predetermined register relationship, electric circuit means responsive to the sensing means for interpreting the direction of departure from said register relationship and for providing selective output impulses for initiating a corrective adjustment, a motor whose direction of rotation is responsive to said selective output impulses, and means responsive to the direction of rotation of said motor for selectively operating said amplitude and spatially varying means to return the cover stiffening elements and the web to the register relationship.

2. A register control apparatus for controlling the application of successive cover stiffening elements in a predetermined longitudinal register relationship with printed matter on a web in a machine for making casings for books wherein a web of binding material having spaced printed matter on one side thereof is intermittently advanced along an operating table having a plurality of operating stations spaced longitudinally thereof, which include, a fixed knife for severing the web into individual casings, a web advancing clamp reciprocating horizontally through an amplitude which is desired to be controlled, a horizontally reciprocating cover board applicator connected to said clamp for drawing cover stiffening elements into spaced engagement with the advancing web and moving to and from a limit which is desired to be controlled in spacing relative to said clamp and to said web severing knife, and vertically reciprocating notching knives connected to said clamp for introducing folding notches in the edges of the web intermediate successive cover stiffening elements and moving to and from a limit which is desired to be controlled in spacing relative to said web severing knife, comprising, in combination, means for varying the amplitude of reciprocation of said clamp, means for varying the spacing between said cover board applicators and said clamp, means for varying the spacing between said clamp and said web severing knife independent of said amplitude varying means, means to sense a departure from the predetermined register relationship, means responsive to the sensing means for interpreting the direction of departure from the register relationship and for providing selective output impulses for initiating corrective adjustments, and means responsive to said output impulses for operating said amplitude and spatially varying means to return the cover stiffening elements and the web to the register relationship.

3. A register control apparatus for controlling the application of successive cover stiffening elements in a predetermined longitudinal register relationship with printed matter on a web in a machine for making casings for books wherein a web of binding material having spaced printed matter on one side thereof is intermittently advanced along an operating table having a plurality of operating stations spaced longitudinally thereof, which include, a fixed knife for severing the web into individual casings, a web advancing clamp reciprocating horizontally through an amplitude which is desired to be controlled, a horizontally reciprocating cover board applicator connected to said clamp for drawing cover stiffening elements into spaced engagement with the advancing web and moving to and from a limit which is desired to be controlled in spacing relative to said clamp and to said web severing knife and vertically reciprocating notching knives connected to said clamp for introducing folding notches in the edges of the web intermediate successive cover stiffening elements and moving to and from a limit which is desired to be controlled in spacing relative to said web severing knife, comprising, in combination, means for varying the amplitude of horizontal reciprocation of said clamp, means for varying the spacing between said cover board applicator and said clamp, means to vary the spacing between said clamp and said web severing knife independent of said amplitude varying means, web sensing means for providing an electrical impulse indicative of the time at which a definite location on the web passes a stationary point on the machine, machine sensing means for providing an electrical impulse indicative of the time at which a definite location on the cover board applicator passes a stationary point on the machine, an electric circuit responsive to said electrical impulses and in accordance with the time relation of their indication for interpreting the direction of departure from said register relationship and for providing selective output impulses for initiating corrective adjustments, and means responsive to said output impulses for remotely operating said amplitude and spatially varying means to return the cover stiffening elements and the web to the register relationship.

4. The combination set forth in claim 3, wherein the means for operating the amplitude and spatially varying means, comprises, a motor whose direction of rotation is responsive to said selective output impulses, a servo mechanism generator driven by said motor, and servo mechanism motors driven by said servo generator included in said amplitude varying means and in each of said spatially varying means for remotely operating said means to return the cover stiffening elements and the web to the register relationship.

5. A register control apparatus for controlling the application of successive cover stiffening elements in a predetermined longitudinal register relationship with printed matter on a web in a machine for making casings for books wherein a web of binding material having spaced printed matter on one side thereof is intermittently advanced along an operating table having a plurality of operating stations spaced longitudinally thereof, which include, a fixed knife for severing the web into individual casings, a web advancing clamp reciprocating horizontally through an amplitude which is desired to be controlled, a horizontally reciprocating cover board applicator connected to said clamp for drawing cover stiffening elements into spaced engagement with the advancing web and moving to and from a limit which is desired to be controlled in spacing relative to said clamp and to said web severing knife and vertically reciprocating notching knives connected to said clamp for introducing folding notches in the edges of the web intermediate successive cover stiffening elements and moving to and from a limit which is desired to be controlled in spacing relative to said web severing knife, comprising, in combination, means for varying the amplitude of horizontal reciprocation of said clamp, means for varying the spacing between said cover board applicator and said clamp in accordance with the variations in amplitude of reciprocation of said clamp, means for varying the spacing between said clamp and said web severing knife in accordance with the variations in amplitude of reciprocation of said clamp independent of said amplitude varying means, sensing means for providing an indication of the time relation between the passage of predetermined locations on the web and on the cover board applicator past stationary points on the machine, said time relation being indicative of a departure from the predetermined register relationship, electric circuit means responsive to the sensing means for interpreting the direction of departure from said register relationship and for providing selective output impulses for initiating a corrective adjustment, a motor whose direction of rotation is responsive to said selective output impulses, and means responsive to the direction of rotation of said motor for selectively operating said amplitude and spatially varying means to return the cover stiffening elements and the web to the register relationship.

6. A register control apparatus for controlling the application of successive cover stiffening elements in a predetermined longitudinal register relationship with printed matter on a web in a machine for making casings for books wherein a web of binding material having spaced printed matter on one side thereof is intermittently advanced along an operating table having a plurality of operating stations spaced longitudinally thereof, which include, a fixed knife for severing the web into individual casings, a web advancing clamp reciprocating horizontally through an amplitude which is desired to be controlled, a horizontally reciprocating cover board applicator connected to said clamp for drawing cover stiffening elements into spaced engagement with the advancing web and moving to and from a limit which is desired to be controlled into spacing relative to said clamp and to said web severing knife and vertically reciprocating notching knives connected to said clamp for introducing folding notches in the edges of the web intermediate successive cover stiffening elements and moving to and from a limit which is desired to be controlled in spacing relative to said web severing knife, comprising, in combination, means for varying the amplitude of horizontal reciprocation of said clamp, means for varying the spacing between said cover board applicator and said clamp in accordance with the variations in amplitude of reciprocation of said clamp, means for varying the spacing between said clamp and said web severing knife in accordance with the variations in amplitude of reciprocation of said clamp independent of said amplitude varying means, web sensing means for providing an electrical impulse indicative of the time at which a definite location on the web passes a stationary point on the machine, machine sensing means for providing an electrical impulse indicative of the time at which a definite location on the cover board applicator passes a stationary point on the machine, an electric circuit responsive to said electrical impulses and in accordance with the time relation of their indication for interpreting the direction of departure from said register relationship and for providing selective output impulses for initiating corrective adjustments, and means responsive to said output impulses for remotely operating said amplitude and spatially varying means to return the cover stiffening elements and the web to the register relationship.

7. The combination set forth in claim 6, wherein the means for operating the amplitude and spatially varying means, comprises, a motor whose direction of rotation is responsive to said selective output impulses, a servo mechanism generator driven by said motor, and servo mechanism in motors driven by said servo generator included in said amplitude varying means and in each of said spatially varying means for remotely operating said means to return the cover stiffening elements and the web to the register relationship.

8. A register control apparatus for controlling the application of successive cover stiffening elements in a predetermined longitudinal register relationship with printed matter on a web in a machine for making casings for books wherein a web of binding material having spaced printed matter on one side thereof is intermittently advanced along an operating table having a plurality of operating stations spaced longitudinally thereof, which include, a fixed knife for severing the web into individual casings, a web advancing clamp reciprocating horizontally through an amplitude which is desired to be controlled, a horizontally reciprocating cover board applicator connected to said clamp for drawing cover stiffening elements into spaced engagement with the advancing web and moving to and from a limit which is desired to be controlled in spacing relative to said clamp and to said web severing knife and vertically reciprocating notching knives connected to said clamp for introducing folding notches in the edges of the web intermediate successive cover stiffening elements and moving to and from a limit which is desired to be controlled in spacing relative to said web severing knife, comprising, in combination, means for varying the amplitude of reciprocation of said clamp, means for varying the spacing between said cover board applicator and said clamp, means for varying the spacing between said clamp and said web severing knife independent of said amplitude varying means, a motor, means for manually controlling the direction of rotation of said motor in accordance with the direction of departure from said register relationship, and means responsive to the direction of rotation of said motor for selectively operating said amplitude and spatially varying means to return the cover stiffening elements and the web to the register relationship.

9. A register control apparatus for controlling the application of successive cover stiffening elements in a predetermined longitudinal register relationship with printed matter on a web in a machine for making casings for books wherein a web of binding material having spaced printed matter on one side thereof is intermittently advanced along an operating table having a plurality of operating stations spaced longitudinally thereof, which include, a fixed knife for severing the web into individual casings, a web advancing clamp reciprocating horizontally through an amplitude which is desired to be controlled, a horizontally reciprocating cover board applicator connected to said clamp for drawing cover stiffening elements into spaced engagement with the advancing web and moving to and from a limit which is desired to be controlled in spacing relative to said clamp and to said web severing knife, and vertically reciprocating notching knives connected to said clamp for introducing folding notches in the edges of the web intermediate successive cover stiffening elements and moving to and from a limit which is desired to be controlled in spacing relative to said web severing knife, comprising, in combination, an adjustable multiplier link for varying the amplitude of reciprocation of said clamp, an adjustable turnbuckle link connected to said multiplier link for varying the spacing between said clamp and said web severing knife in accordance with the variations in amplitude of reciprocation of said clamp independent of said multiplier link, means for varying the spacing between said cover board applicator and said clamp in accordance with the variations in amplitude of reciprocation of said clamp, web sensing means for providing an electrical impulse indicative of the time at which a definite location on the web passes a stationary point on the machine, machine sensing means for providing an electrical impulse indicative of the time at which a definite location on the cover board applicator passes a stationary point on the machine, an electric circuit responsive to said electrical impulses and in accordance with the time relation of their indication for interpreting the direction of departure from said register relationship and for providing selective output impulses for initiating corrective adjustments, a motor whose direction of rotation is responsive to said selective output impulses, a servo mechanism generator driven by said motor, and servo mechanism motors responsive to rotation of said servo generator for remotely driving said multipler link, turnbuckle link and spatially varying means to return the cover stiffening elements and the web to the register relationship.

10. A register control apparatus for controlling the application of successive cover stiffening elements in a predetermined longitudinal register relationship with printed matter on a web in a machine for making casings for books wherein a web of binding material having spaced printed matter on one side thereof is intermittently advanced along an operating table having a plurality of operating stations spaced longitudinally thereof, which include, a fixed knife for severing the web into individual casings, a web advancing clamp reciprocating horizontally through an amplitude which is desired to be controlled, a horizontally reciprocating cover board applicator connected to said clamp for drawing cover stiffening elements into spaced engagement with the advancing web and moving to and from a limit which is desired to be controlled in spacing relative to said clamp and to said web severing knife, and vertically reciprocating notching knives connected to said clamp for introducing folding notches in the edges of the web intermediate successive cover stiffening elements and moving to and from a limit which is desired to be controlled in spacing relative to said web severing knife, comprising, in combination, an adjustable multiplier link for varying the amplitude of reciprocation of said clamp, an adjustable turnbuckle link connected to said multiplier link for varying the spacing between said clamp and said web severing knife in accordance with the variations in amplitude of reciprocation of said clamp independent of said multiplier link, means for varying the spacing between said cover board applicator and said clamp in accordance with the variations in amplitude of reciprocation of said clamp, a motor, a manually operable switch for controlling the direction of rotation of said motor in accordance with the direction of departure from said register relationship, a servo mechanism generator driven by said motor, and servo mechanism motors responsive to rotation of said servo generator for remotely driving said multiplier link, turnbuckle link and spatially varying means to return the cover stiffening elements and the web to the register relationship.

11. The combination as set forth in claim 6, wherein said electric circuit comprises, a first sub-circuit responsive to the electric impulses from said web sensing means, a second sub-circuit responsive to the electrical impulses from said machine sensing means, each of said first and second sub-circuits including pulse forming means for forming pulses of different electrical characteristics, each of said first and second sub-circuits including means responsive to the pulse forming means of both said first and second sub-circuits for interpreting the direction of departure from the register relationship, and means responsive to said pulse responsive means for providing selective output pulses for initiating the corrective adjustments.

12. The combination as set forth in claim 6, wherein said electric circuit comprises, a first sub-circuit responsive to the electrical impulses from said web sensing means, a second sub-circuit responsive to the electrical impulses from said machine sensing means, each of said first and second sub-circuits including pulse forming means for forming pulses of different durations, circuit means interconnecting said first and second sub-circuits, said first sub-circuit including means responsive to the pulses forming in both said first and second sub-circuits, said second sub-circuit including means responsive to the pulses formed in said first and second sub-circuits, each of said pulse responsive means disposed to interpret the direction of departure from the register relationship, and means responsive to said last mentioned means for providing selective output pulses for initiating the corrective adjustments.

13. The combination as set forth in claim 6, wherein said electric circuit comprises, a first sub-circuit responsive to the electrical impulses from said web sensing means, a second sub-circuit responsive to the electrical impulses from said machine sensing means, each of said first and second sub-circuits including pulse forming means for forming electrical pulses of long and short durations, circuit means interconnecting said first and second sub-circuits, said first sub-circuit including means responsive to the simultaneous reception of the long pulses formed in said second sub-circuit and the short pulses formed in said first sub-circuit, said second sub-circuit including means responsive to the simultaneous reception of the long pulse formed in said first sub-circuit and the short pulse formed in said second sub-circuit, each of said pulse responsive means disposed to interpret the direction of departure from the register relationship, means responsive to the pulse responsive means for providing selective output pulses for initiating the corrective adjustments, and means included in said last mentioned means for controlling the time duration of the selective output pulses.

EMMON BACH.
JOHN P. GRATIOT.
OWEN L. GORE.
GARRETT B. LINDERMAN, Jr.

REFERENCES CITED

The following references are of record in the file of this patent:

UNITED STATES PATENTS

| Number | Name | Date |
|---|---|---|
| 2,166,038 | Chambon | July 11, 1939 |
| 2,429,500 | Wolfner | Oct. 21, 1947 |
| 2,435,207 | Dimond | Feb. 3, 1948 |
| 2,482,812 | Treseder | Sept. 27, 1949 |